(12) United States Patent
Fukaumi et al.

(10) Patent No.: US 6,210,450 B1
(45) Date of Patent: Apr. 3, 2001

(54) METHOD OF MAKING SOLID ELECTROLYTE CAPACITOR USING A CONDUCTING POLYMER SOLID ELECTROLYTIC CAPACITOR USING A CONDUCTING POLYMER METHOD OF MAKING

(75) Inventors: Takashi Fukaumi; Kenji Araki; Satoshi Arai; Yuji Aoki; Kenichi Takahashi, all of Toyama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/626,076

(22) Filed: Jul. 26, 2000

Related U.S. Application Data

(62) Division of application No. 09/121,269, filed on Jul. 23, 1998.

(30) Foreign Application Priority Data

Jul. 30, 1997 (JP) .................................. 9-204877

(51) Int. Cl.$^7$ ...................................... H01G 9/00
(52) U.S. Cl. ................................. 29/25.03; 438/240
(58) Field of Search .................... 29/25.03; 438/240, 438/800, 239, 250–252; 361/525

(56) References Cited

U.S. PATENT DOCUMENTS

| 5,473,503 | 12/1995 | Sakuta et al. ............... 361/525 |
| 5,729,428 | * 3/1998 | Sakata et al. ............... 361/525 |
| 5,812,367 | 9/1998 | Kudoh et al. ............... 361/523 |
| 5,914,852 | 6/1999 | Hatanaka et al. ............ 361/523 |

FOREIGN PATENT DOCUMENTS

| 64-32619 | 2/1969 | (JP) . |
| 64-32619 | 2/1989 | (JP) . |
| 64-36012 | 2/1989 | (JP) . |
| 64-74712 | 3/1989 | (JP) . |
| 1-225110 | 9/1989 | (JP) . |
| 2-15611 | 1/1990 | (JP) . |
| 2-117121 | 5/1990 | (JP) . |
| 3-35516 | 2/1991 | (JP) . |
| 3-64013 | 3/1991 | (JP) . |
| 4-137517 | 5/1992 | (JP) . |
| 5-304055 | 11/1993 | (JP) . |
| 6-45199 | 2/1994 | (JP) . |
| 6-45200 | 2/1994 | (JP) . |
| 6-45201 | 2/1994 | (JP) . |
| 7-45481 | 2/1995 | (JP) . |
| 10-284351 | 10/1998 | (JP) . |

* cited by examiner

Primary Examiner—Charles Bowers
Assistant Examiner—Craig Thompson
(74) Attorney, Agent, or Firm—Sughrue, Mion, Zinn, Macpeak & Seas, PLLC

(57) ABSTRACT

In a method of making a solid electrolytic capacitor using an oxide film of an electrochemical valve metal as the dielectric and having, as solid electrolytes, first and second conducting polymer layers formed successively on the oxide film, the first and second conducting polymer layers are formed by chemical oxidative polymerization processes using an oxidizing agent, and the first conducting polymer layer (3) is formed from a compound having a lower reaction rate than the compound used to form the second conducting polymer layer (4).

According to this method, there can be obtained solid electrolytic capacitors having high heat resistance and showing an improvement in capacitance appearance factor and frequency characteristics.

5 Claims, 1 Drawing Sheet

METHOD OF MAKING SOLID ELECTROLYTE CAPACITOR USING A CONDUCTING POLYMER SOLID ELECTROLYTIC CAPACITOR USING A CONDUCTING POLYMER METHOD OF MAKING

This is a divisional of application Ser. No. 09/121,269 filed Jul. 23, 1998, the disclosure of which is incorporated herein by reference.

BACKGROUND OF THE INVENTION

1. Field of the Invention

This invention relates to solid electrolytic capacitors using conducting polymer layers as solid electrolytes, and a method of making the same.

2. Prior Art

With the progress of science and technology, a reduction in the size of electronic equipment and an improvement in the reliability thereof are being desired. In the field of capacitors, there is a growing demand for high-capacitance solid electrolytic capacitors having good characteristics even in a high frequency region and, moreover, a high degree of reliability. In order to meet this demand, research and development are being actively carried on.

Usually, a solid electrolytic capacitor has a structure in which a porous compact of an electrochemical valve metal such as tantalum or aluminum is used as a first electrode (anode), an oxide film thereof as a dielectric, and a solid electrolyte such as manganese dioxide ($MnO_2$) or a 7,7', 8,8'-tetracyanoquinodimethane (TCNQ) complex as part of a second electrode (cathode). In this case, the solid electrolyte must perform the function of electrically connecting the whole dielectric surfaces within the porous compact with an electrode lead, and the function of repairing electrical short circuits arising from defects of the dielectric film. Consequently, metals having a high electric conductivity but lacking the dielectric repairing function cannot be used as solid electrolytes. For this reason, manganese dioxide which is converted into an insulator, for example, upon exposure to heat generated by a short-circuit current has been used. However, in capacitors using manganese dioxide as part of the cathode, the impedance in a high frequency region is not lowered because of the insufficient electric conductivity of manganese dioxide. On the other hand, capacitors using a TCNQ complex as part of the cathode have poor heat resistance because TCNQ complex are liable to thermal decomposition.

Recently, the development of new materials in the field of polymers has made considerable progress. As a result, conducting polymers comprising conjugated polymers (e.g., polyacetylene, poly-p-phenylene, polypyrrole and polyaniline) doped with an electron-donating or electron-attracting compound (dopant) have been developed. Among others, five-membered heterocyclic compounds (e.g., polypyrrole and polythiophene) and polyaniline can easily yield conducting polymers by electrolytic polymerization, and such conducting polymers are being used as solid electrolytes for capacitors (Japanese Patent Laid-Open Nos. 36012/'89 and 64013/'91). However, this method involves electrolytic polymerization on an oxide film having electrical insulating properties, so that it has been very difficult to form a uniform conducting polymer film.

Accordingly, a method which comprises first forming an electrically-conductive precoat layer and then forming a conducting polymer on the oxide film by electrolytic polymerization is being extensively employed (Japanese Patent Laid-Open Nos. 32619/'89, 36012/'89, 74712/'89, 225110/'89, 117121/'90, 64013/'91, 304055/'93 and 45200/'94). However, this method has the disadvantage that an auxiliary electrode must be disposed in proximity to the capacitor device, resulting in very low mass productivity.

There has also been proposed a method for applying a conducting polymer soluble in an organic solvent and then drying it to form a polymer layer useful as a solid electrolyte. For example, it has been proposed to make a solid electrolytic capacitor using polyaniline as the solid electrolyte according to a method in which a solution of previously prepared polyaniline is applied onto the surface of an oxide film of a metal and then dried to form a layer of polyaniline (Japanese Patent Laid-Open No. 35516/'91). However, this method has the disadvantage that the polyaniline solution has very high viscosity and fails to permeate throughout an oxide film having a finely porous structure and hence a highly extended surface area. As a result, in the capacitors made by this method, the capacitance appearance factor (i.e., the ratio of the actual value of electrostatic capacity to the design value) is significantly low.

On the other hand, a method for forming polyaniline by polymerizing aniline monomer on an oxide film is known. In this case, a satisfactorily high capacitance appearance factor can be achieved. However, since polyaniline itself has a lower electric conductivity than polypyrrole, the capacitors made by this method have the disadvantage that their characteristics in a high frequency region are poorer than those of capacitors using polypyrrole.

Moreover, a method for forming polypyrrole by polymerizing pyrrole monomer on an oxide film is also known. However, since polypyrrole is not be easily formed in the central part of a porous body, it is difficult to coat an oxide film having a finely porous structure completely with polypyrrole. As a result, the capacitor thus obtained has the disadvantage of showing a low capacitance appearance factor.

Furthermore, a method for forming a derivative of polythiophene on an oxide film has been proposed (Japanese Patent Laid-Open No. 15611/'90). The polymer formed by this method undergoes a high degree of shrinkage and hence tends to peel from the capacitor device, resulting an increase in impedance. Moreover, since the oxide film is exposed in the parts where the polymer has peeled off, the device becomes mechanically weak against external stresses and tends to show an increase in leakage current. Thus, it is impossible to secure the reliability of the device.

Furthermore, it has been proposed to use two layers of conducting polymer having different properties as solid electrolytes and thereby make the most of the characteristics of each compound (Japanese Patent Laid-Open Nos. 45481/'95, 45199/'94 and 45201/'94). Specifically, according to this method, the capacitance appearance factor of a capacitor can be enhanced by forming relatively easily formable polyaniline in the inside of the device and then forming polypyrrole thereon, or the heat resistance of a capacitor can be improved by forming polypyrrole having a high electric conductivity in the inside of the device and then forming thereon polyaniline having high heat resistance. In the former case (polyaniline/polypyrrole), the capacitance appearance factor is enhanced, but the impedance in a high frequency region is not sufficiently lowered because of the low electric conductivity of polyacetylene. In the latter case (polypyrrole/polyaniline), the heat resistance is improved, but the capacitance appearance factor is reduced because polypyrrole cannot be easily formed in the inside of the device.

As described above, conventional solid electrolytic capacitors have involved difficulty in improving their capacitance appearance factor, frequency characteristics, heat resistance and reliability at the same time.

SUMMARY OF THE INVENTION

An object of the present invention is to provide a solid electrolytic capacitor having high heat resistance and showing an improvement in capacitance appearance factor and frequency characteristics, as well as a method of making the same.

A first aspect of the present invention relates to a solid electrolytic capacitor using conducting polymers. Specifically, according to this first aspect, there is provided a solid electrolytic capacitor using an oxide film of an electrochemical valve metal as the dielectric and having, as solid electrolytes, first and second conducting polymer layers formed successively on the oxide film by polymerization reactions, wherein the first conducting polymer layer is formed from a compound having a lower reaction rate than the compound used to form the second conducting polymer layer.

A second aspect of the present invention relates to a method of making a solid electrolytic capacitor using conducting polymers. Specifically, according to this second aspect, there is provided a method of making a solid electrolytic capacitor using an oxide film of an electrochemical valve metal as the dielectric and having, as solid electrolytes, first and second conducting polymer layers formed successively on the oxide film, which comprises forming the first and second conducting polymer layers by chemical oxidative polymerization processes using an oxidizing agent, and forming the first conducting polymer layer from a compound having a lower reaction rate than the compound used to form the second conducting polymer layer.

A first effect of the present invention is that a high capacitance appearance factor can be achieved in capacitor devices having a finely porous structure and hence a highly extended surface area.

A second effect of the present invention is that solid electrolytic capacitors having good frequency characteristics can be made.

A third effect of the present invention is that highly reliable solid electrolytic capacitors having excellent heat resistance and a method of making the same can be provided.

PREFERRED EMBODIMENTS OF THE INVENTION

Figure 1:
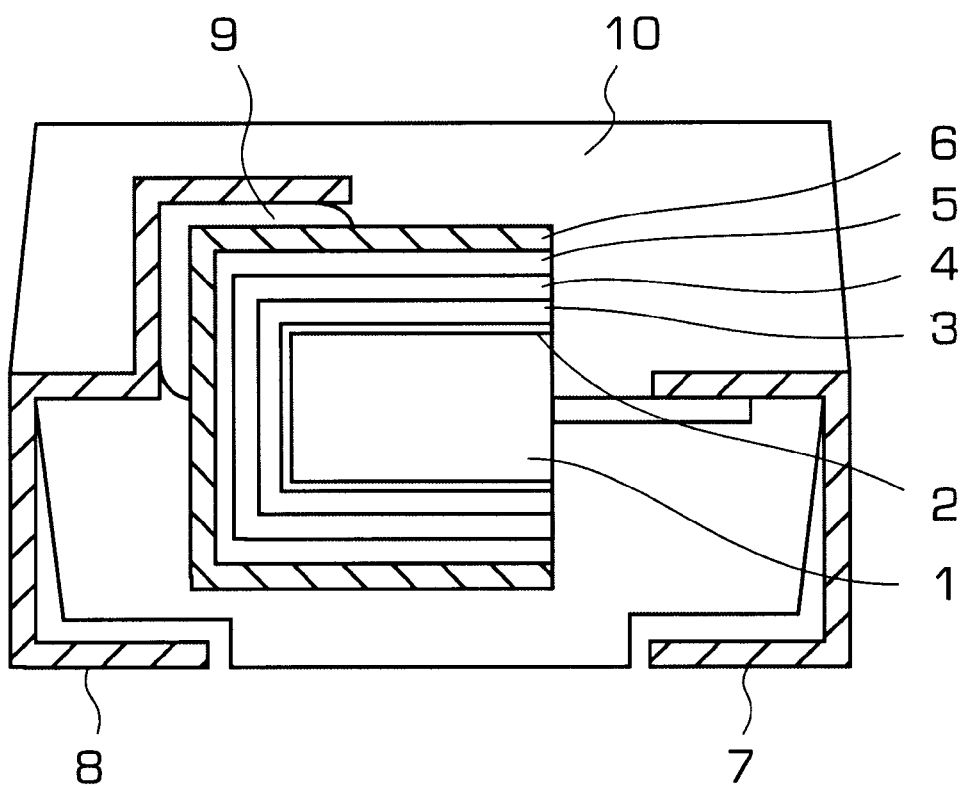
FIG. 1 is a sectional view of a solid electrolytic capacitor made in accordance with one embodiment of the present invention. In this figure, numeral 1 designates a porous compact (or sintered pellet); 2, a dielectric film; 3, a first conducting polymer layer; 4, a second conducting polymer layer; 5, a graphite layer; 6, an electrode contact layer; 7, an anode lead; 8, a cathode lead; 9, an electrically-conductive paste layer; and 10, an epoxy resin.

In one embodiment of the present invention, the polymerization reactions are carried out by chemical oxidative polymerization processes using an oxidizing agent, and the first and second conducting polymer layers formed on the oxide film each comprise a layer of a polymer of aniline, pyrrole, thiophene or a derivative thereof.

In preferred embodiments of the present invention, for example, a polymer of thiophene or a derivative thereof which is obtained by the chemical oxidative polymerization of thiophene monomer or a derivative thereof is used as the first conducting polymer having a lower reaction rate. Then, a polymer of pyrrole or a derivative thereof is formed on its outer surface as a conducting polymer having a higher electric conductivity, or a polymer of aniline or a derivative thereof is formed on its outer surface as a conducting polymer having higher heat resistance.

More specifically, several preferred embodiments as follows:

the first conducting polymer layer comprising a polymer of thiophene or a derivative thereof and the second conducting polymer layer comprising a polymer of aniline or a derivative thereof are each formed by a chemical oxidative polymerization process using an oxidizing agent;

the first conducting polymer layer comprising a polymer of thiophene or a derivative thereof and the second conducting polymer layer comprising a polymer of pyrrole or a derivative thereof are each formed by a chemical oxidative polymerization process using an oxidizing agent;

the first conducting polymer layer comprising a polymer of 3,4-ethylenedioxythiophene and the second conducting polymer layer comprising a polymer of aniline or a derivative thereof are each formed by a chemical oxidative polymerization process using an oxidizing agent; or the first conducting polymer layer comprising a polymer of 3,4-ethylenedioxythiophene and the second conducting polymer layer comprising a polymer of pyrrole or a derivative thereof are each formed by a chemical oxidative polymerization process using an oxidizing agent.

Now, the present invention is explained with reference to the accompanying drawing. FIG. 1 is a sectional view of a solid electrolytic capacitor in accordance with one embodiment of the present invention.

The surface of a porous compact 1 of an electrochemical valve metal (i.e., tantalum or aluminum), which serves as an anode, has very fine pores so as to extend its surface area. A dielectric film 2 of a metallic oxide is formed on the wall surfaces of these pores. Then, first and second conducting polymer layers 3 and 4, which serve as solid electrolytes, are successively formed on the surface of the dielectric film 2 so that they penetrate deep into the pores. The reaction rates of conducting polymers vary according to the type and position of the substituent group(s) and the oxidation-reduction process employed. However, they qualitatively decrease in the following order: polypyrrole>polythiophene>polyaniline. The first conducting polymer layer 3 is formed from a compound having a lower reaction rate than the compound used to form the second conducting polymer layer 4.

The electric conductivities of conducting polymers are affected by the type of the dopant, the degree of polymerization, and the type of the substituent group(s). However, they qualitatively decrease in the following order: polypyrrole>polythiophene>polyaniline. An electrode contact layer 6 serving as a cathode is formed on the surface of the second conducting polymer layer 4. In order to establish good electrical contact, a graphite layer 5 may be formed between the electrode contact layer 6 and the second conducting polymer layer 4. Moreover, an anode lead 7 is attached to a metal rod implanted in the compact 1, and a cathode lead 8 is attached to the electrode contact layer 6 through the medium of an electrically-conductive paste layer 9.

Referring to FIG. 1, the present invention is further illustrated by the following examples. However, it is to be understood that the present invention is not limited to these examples.

EXAMPLE 1

A porous compact comprising a sintered pellet 1 of finely powdered tantalum in the shape of a rectangular parallelepiped having 1 mm long sides was anodically oxidized at 33 V in a 0.1 wt. % aqueous solution of nitric acid. Thus, a dielectric film 2 was formed on the surfaces thereof.

Then, a solution was prepared by dissolving thiophene monomer and ferric p-toluenesulfonate in methanol so that thiophene monomer and ferric p-toluenesulfonate were present in a ratio of 1:2 and at a concentration of 15% by weight based on the weight of the methanol. While this solution was maintained at −30° C., the sintered pellet 1 having the dielectric film 2 formed thereon was soaked in the solution for 1 minute. Thereafter, the sintered pellet 1 was taken out and held at room temperature for 30 minutes to effect polymerization. This procedure was repeated three times. Subsequently, the sintered pellet 1 was washed in butanol for 30 minutes. Thus, a first conducting polymer layer 3 comprising black polythiophene was formed on the dielectric film 2.

Then, a pyrrole solution was prepared by dissolving pyrrole and ferric p-toluenesulfonate in methanol so that pyrrole and ferric p-toluenesulfonate were present in a ratio of 1:2 and at a concentration of 15% by weight based on the weight of the methanol. While this pyrrole solution was maintained at −30° C., the sintered pellet 1 was soaked therein for 1 minute. Thereafter, the sintered pellet 1 was taken out and held at room temperature for 30 minutes to effect polymerization. This procedure was repeated four times. Thus, a second conducting polymer layer 4 comprising black polypyrrole was formed on the first conducting polymer layer 3. Moreover, a carbon paste and a silver paste were successively applied and dried to form a graphite layer 5 and an electrode contact layer 6, respectively. Finally, an anode lead 7 and a cathode lead 8 were attached and the whole assembly was encapsulated with an epoxy resin 10 to complete a capacitor.

EXAMPLE 2

A capacitor was completed in the same manner as in Example 1, except that the polypyrrole constituting the second conducting polymer layer 4 in Example 1 was replaced by polyaniline.

Specifically, after the formation of the first conducting polymer layer 3, an aniline solution was prepared by dissolving equimolar amounts of aniline and p-toluenesulfonic acid in a mixed solvent composed of 70% by weight of methanol and 30% by weight of water so that aniline and p-toluenesulfonic acid were present at a concentration of 15% by weight based on the weight of the solvent. While this aniline solution was maintained at 0° C., the sintered pellet 1 was soaked therein for 30 seconds, and then soaked in a 25 wt. % aqueous solution of ammonium peroxodisulfate at 0° C. for 30 minutes. Thereafter, the sintered pellet 1 was taken out and held at room temperature for 30 minutes to effect polymerization. This procedure was repeated five times. Thus, a second conducting polymer layer 4 comprising black polyaniline was formed.

EXAMPLE 3

A capacitor was completed in the same manner as in Example 1, except that the method employed in Example 1 for the formation of the first conducting polymer layer 3 (polythiophene) was changed.

Specifically, the sintered pellet 1 was soaked in thiophene monomer for 1 minute and then held at room temperature for 5 minutes. Thereafter, the sintered pellet 1 was soaked in a 50 wt. % solution of ferric p-toluenesulfonate in butanol for 10 minutes and held at room temperature for 30 minutes to effect polymerization. This procedure was repeated three times. Subsequently, the sintered pellet 1 was washed in butanol for 30 minutes. Thus, a first conducting polymer layer 3 comprising black polythiophene was formed. Thereafter, a second conducting polymer layer comprising polypyrrole was formed in the same manner as in Example 1.

EXAMPLE 4

A capacitor was completed in the same manner as in Example 1, except that the polythiophene constituting the first conducting polymer layer 3 in Example 1 was replaced by poly(3,4-ethylenedioxythiophene).

Specifically, a solution was prepared by dissolving 3,4-ethylenedioxythiophene and ferric p-toluenesulfonate in butanol so that 3,4-ethylenedioxythiophene and ferric p-toluenesulfonate were present in a ratio of 1:2 and at a concentration of 15% by weight based on the weight of the butanol. While this solution was maintained at −30° C., the sintered pellet 1 was soaked therein for 1 minute. Thereafter, the sintered pellet 1 was taken out and held at room temperature for 30 minutes to effect polymerization. This procedure was repeated three times. Subsequently, the sintered pellet 1 was washed in butanol for 15 minutes. Thus, a first conducting polymer layer 3 comprising black poly(3,4-ethylenedioxythiophene) was formed. Thereafter, a second conducting polymer layer comprising polypyrrole was formed in the same manner as in Example 1.

EXAMPLE 5

A capacitor was completed in the same manner as in Example 2, except that the first conducting polymer layer 3 and the method for its formation were changed.

Specifically, a solution was prepared by dissolving 3,4-ethylenedioxythiophene and ferric p-toluenesulfonate in butanol so that 3,4-ethylenedioxythiophene and ferric p-toluenesulfonate were present in a ratio of 1:2 and at a concentration of 15% by weight based on the weight of the butanol. While this solution was maintained at −30° C., the sintered pellet 1 was soaked therein for 1 minute. Thereafter, the sintered pellet 1 was taken out and held at room temperature for 30 minutes to effect polymerization. This procedure was repeated three times. Subsequently, the sintered pellet 1 was washed in butanol for 15 minutes. Thus, a first conducting polymer layer 3 comprising black poly(3,4-ethylenedioxythiophene) was formed. Thereafter, a second conducting polymer layer comprising polyaniline was formed in the same manner as in Example 2.

EXAMPLE 6

A capacitor was completed in the same manner as in Example 4, except that the method for the formation of the second conducting polymer layer 4 (polypyrrole) was changed.

Specifically, after the formation of the first conducting polymer layer 3 comprising poly(3,4- ethylenedioxythiophene), the sintered pellet 1 was soaked in pyrrole monomer for 1 minute and then held at room temperature for 5 minutes. Thereafter, the sintered pellet 1 was soaked in a 50 wt. % solution of ferric dodecylbenzenesulfonate in methanol for 10 minutes and held at room temperature for 15 minutes to effect polymerization. This procedure was repeated four times. Subsequently, the sintered pellet 1 was washed in methanol for 30 minutes. Thus, a second conducting polymer layer 4 comprising black polypyrrole was formed.

EXAMPLE 7

A capacitor was completed in the same manner as in Example 1, except that, in forming the second conducting polymer layer 4 (polypyrrole), ferric dodecylbenzenesulfonate was used in place of ferric p-toluenesulfonate.

EXAMPLE 8

A capacitor was completed in the same manner as in Example 1, except that, in forming the second conducting polymer layer 4 (polypyrrole), ferric naphthalenesulfonate was used in place of ferric p-toluenesulfonate.

EXAMPLE 9

A capacitor was completed in the same manner as in Example 1, except that, in forming the second conducting polymer layer 4, 3,4-dimethylpyrrole was used in place of pyrrole.

COMPARATIVE EXAMPLE 1

A sintered pellet 1 of finely powdered tantalum similar to that used in Example 1 was anodically oxidized at 33 V in a 0.1 wt. % aqueous solution of nitric acid to form a dielectric film 2.

Then, an aniline solution was prepared by dissolving equimolar amounts of aniline and p-toluenesulfonic acid in a mixed solvent composed of 70% by weight of ethanol and 30% by weight of water so that aniline and p-toluenesulfonic acid were present at a concentration of 10% by weight based on the weight of the solvent. While this aniline solution was maintained at 0° C., the sintered pellet 1 was soaked therein for 30 seconds, and then soaked in a 25 wt. % aqueous solution of ammonium peroxodisulfate at 0° C. for 30 minutes. Thereafter, the sintered pellet 1 was taken out and held at room temperature for 30 minutes to effect polymerization. This procedure was repeated twice. Thus, a first conducting polymer layer 3 comprising black polyaniline was formed on the dielectric film 2.

Then, a pyrrole solution was prepared by dissolving pyrrole and ferric dodecylbenzenesulfonate in methanol so that pyrrole and ferric dodecylbenzenesulfonate were present in a ratio of 1:2 and at a concentration of 15% by weight based on the weight of the methanol. While this pyrrole solution was maintained at −30° C., the sintered pellet 1 was soaked therein for 1 minute. Thereafter, the sintered pellet 1 was taken out and held at room temperature for 30 minutes to effect polymerization. This procedure was repeated four times. Thus, a second conducting polymer layer 4 comprising black polypyrrole was formed. Moreover, a carbon paste and a silver paste were successively applied and dried to form a graphite layer 5 and an electrode contact layer 6, respectively. Finally, an anode lead 7 and a cathode lead 8 were attached and the whole assembly was encapsulated with an epoxy resin 10 to complete a capacitor.

COMPARATIVE EXAMPLE 2

A sintered pellet 1 of finely powdered tantalum similar to that used in Example 1 was anodically oxidized at 33 V in a 0.1 wt. % aqueous solution of nitric acid to form a dielectric film 2.

Then, a pyrrole solution was prepared by dissolving pyrrole and ferric dodecylbenzenesulfonate in methanol so that pyrrole and ferric dodecylbenzenesulfonate were present in a ratio of 1:2 and at a concentration of 15% by weight based on the weight of the methanol. While this pyrrole solution was maintained at −30° C., the sintered pellet 1 was soaked therein for 1 minute. Thereafter, the sintered pellet 1 was taken out and held at room temperature for 30 minutes to effect polymerization. This procedure was repeated three times. Thus, a first conducting polymer layer 3 comprising black polypyrrole was formed on the dielectric film 2.

Then, an aniline solution was prepared by dissolving equimolar amounts of aniline and p-toluenesulfonic acid in a mixed solvent composed of 70% by weight of methanol and 30% by weight of water so that aniline and p-toluenesulfonic acid were present at a concentration of 15% by weight based on the weight of the solvent. While this aniline solution was maintained at 0° C., the sintered pellet 1 was soaked therein for 30 seconds, and then soaked in a 25 wt. % aqueous solution of ammonium peroxodisulfate at 0° C. for 30 minutes. Thereafter, the sintered pellet 1 was taken out and held at room temperature for 30 minutes to effect polymerization. This procedure was repeated five times. Thus, a second conducting polymer layer 4 comprising black polyaniline was formed. Thereafter, leads were attached in the same manner as in Example 1 to complete a capacitor.

COMPARATIVE EXAMPLE 3

A sintered pellet 1 of finely powdered tantalum similar to that used in Example 1 was anodically oxidized at 33 V in a 0.1 wt. % aqueous solution of nitric acid to form a dielectric film 2.

Then, a solution was prepared by dissolving 3,4-ethylenedioxythiophene and ferric p-toluenesulfonate in butanol so that 3,4-ethylenedioxythiophene and ferric p-toluenesulfonate were present in a ratio of 1:2 and at a concentration of 15% by weight based on the weight of the butanol. While this solution was maintained at −30° C., the sintered pellet 1 was soaked therein for 1 minute. Thereafter, the sintered pellet 1 was taken out and held at room temperature for 30 minutes to effect polymerization. This procedure was repeated six times. Subsequently, the sintered pellet 1 was washed in butanol for 15 minutes. Thus, a conducting polymer layer comprising black poly(3,4-ethylenedioxythiophene) was formed.

With respect to each of the solid electrolytic capacitors obtained in the foregoing examples and comparative examples, the types of the conducting polymer layers used, the capacitance appearance factor C/Co (in which Co is the capacitance in an electrolytic solution), and the leakage currents (LC) and resonance frequency impedances (Z) before and after a high-temperature exposure test (at 150° C. for 500 hours) are shown in Table 1.

TABLE 1

| | First conducting polymer layer | Second conducting polymer layer | Capacitance appearance factor, C/Co (%) | Leakage current, LC (nA) | Impedance, Z (mΩ) |
|---|---|---|---|---|---|
| Example 1 | Polythiophene | Polypyrrole | (Before test) 99 | 16 | 184 |
| | | | (After test) 97 | 13 | 199 |
| Example 2 | Polthiophene | Polyaniline | (Before test) 99 | 15 | 201 |
| | | | (After test) 97 | 12 | 199 |
| Example 3 | Polythiophene | Polypyrrole | (Before test) 99 | 18 | 18 1 |
| | | | (After test) 97 | 16 | 203 |
| Example 4 | Poly(3,4-ethylene dioxythiophene) | Polypyrrole | (Before test) 98 | 22 | 173 |
| | | | (After test) 96 | 18 | 175 |
| Example 5 | Poly(3,4-ethylene dioxythiophene) | Polyaniline | (Before test) 98 | 21 | 208 |
| | | | (After test) 97 | 20 | 207 |
| Example 6 | Poly(3,4-ethylene dioxythiophene) | Polypyrrole | (Before test) 98 | 19 | 177 |
| | | | (After test) 96 | 13 | 182 |
| Example 7 | Polythiophene | Polypyrrole | (Before test) 99 | 15 | 199 |
| | | | (After test) 97 | 11 | 207 |
| Example 8 | Polythiophene | Polypyrrole | (Before test) 99 | 15 | 198 |
| | | | (After test) 96 | 11 | 203 |
| Comparative Example 1 | Polyaniline | Polypyrrole | (Before test) 99 | 18 | 260 |
| | | | (After test) 96 | 17 | 261 |
| Comparative Example 2 | Polypyrrole | Polyaniline | (Before test) 93 | 18 | 183 |
| | | | (After test) 87 | 13 | 182 |
| Comparative Example 3 | Poly(3,4-ethylene dioxythiophene) | | (Before test) 98 | 23 | 177 |
| | | | (After test) 96 | 1265 | 526 |

As can be seen from Table 1, the capacitors obtained in the examples of the present invention show a high capacitance appearance factor even in capacitor devices having a highly extended surface area, and a low impedance which is excellent in frequency characteristics. Moreover, it can also be seen that they have excellent frequency characteristics and high heat resistance.

In the foregoing examples, the combinations of the first conducting polymer layer and the second conducting polymer layer were as follows: polythiophene/polypyrrole, polythiophene/polyaniline, poly(3,4-ethylenedioxythiophene)/polypyrrole, poly(3,4-ethylenedioxythiophene)/polyaniline and poly(3,4-ethylenedioxythiophene)/poly(3,4-dimethylpyrrole). However, it is to be understood that the present invention is not limited to these combinations.

Moreover, dodecylbenzenesulfonic acid, p-toluenesulfonic acid, benezenedisulfonic acid and naphthalenesulfonic acid were used as dopants. However, it is to be understood that the present invention is not limited to these dopants. For example, aromatic sulfonic acids such as sulfobenzoic acid may also be used.

What is claimed is:

1. A method of making a solid electrolytic capacitor using an oxide film of an electrochemical valve metal as the dielectric and having, as solid electrolytes, first and second conducting polymer layers formed successively on the oxide film, which comprises forming said first and second conducting polymer layers by chemical oxidative polymerization processes using an oxidizing agent, and forming said first conducting polymer layer from a compound having a lower reaction rate than the compound used to form said second conducting polymer layer.

2. A method of making a solid electrolytic capacitor as claimed in claim 1 wherein said first conducting polymer layer comprising a polymer of thiophene or a derivative thereof and said second conducting polymer layer comprising a polymer of aniline or a derivative thereof are each formed by a chemical oxidative polymerization process using an oxidizing agent.

3. A method of making a solid electrolytic capacitor as claimed in claim 1, wherein said first conducting polymer layer comprising a polymer of thiophene or a derivative thereof and said second conducting polymer layer comprising a polymer of pyrrole or a derivative thereof are each formed by a chemical oxidative polymerization process using an oxidizing agent.

4. A method of making a solid electrolytic capacitor as claimed in claim 1 wherein said first conducting polymer layer comprising a polymer of 3,4-ethylenedioxythiophene and said second conducting polymer layer comprising a polymer of aniline or a derivative thereof are each formed by a chemical oxidative polymerization process using an oxidizing agent.

5. A method of making a solid electrolytic capacitor as claimed in claim 1 wherein said first conducting polymer layer comprising a polymer of 3,4-ethylenedioxythiophene and said second conducting polymer layer comprising a polymer of pyrrole or a derivative thereof are each formed by a chemical oxidative polymerization process using an oxidizing agent.

* * * * *